Patented May 28, 1935

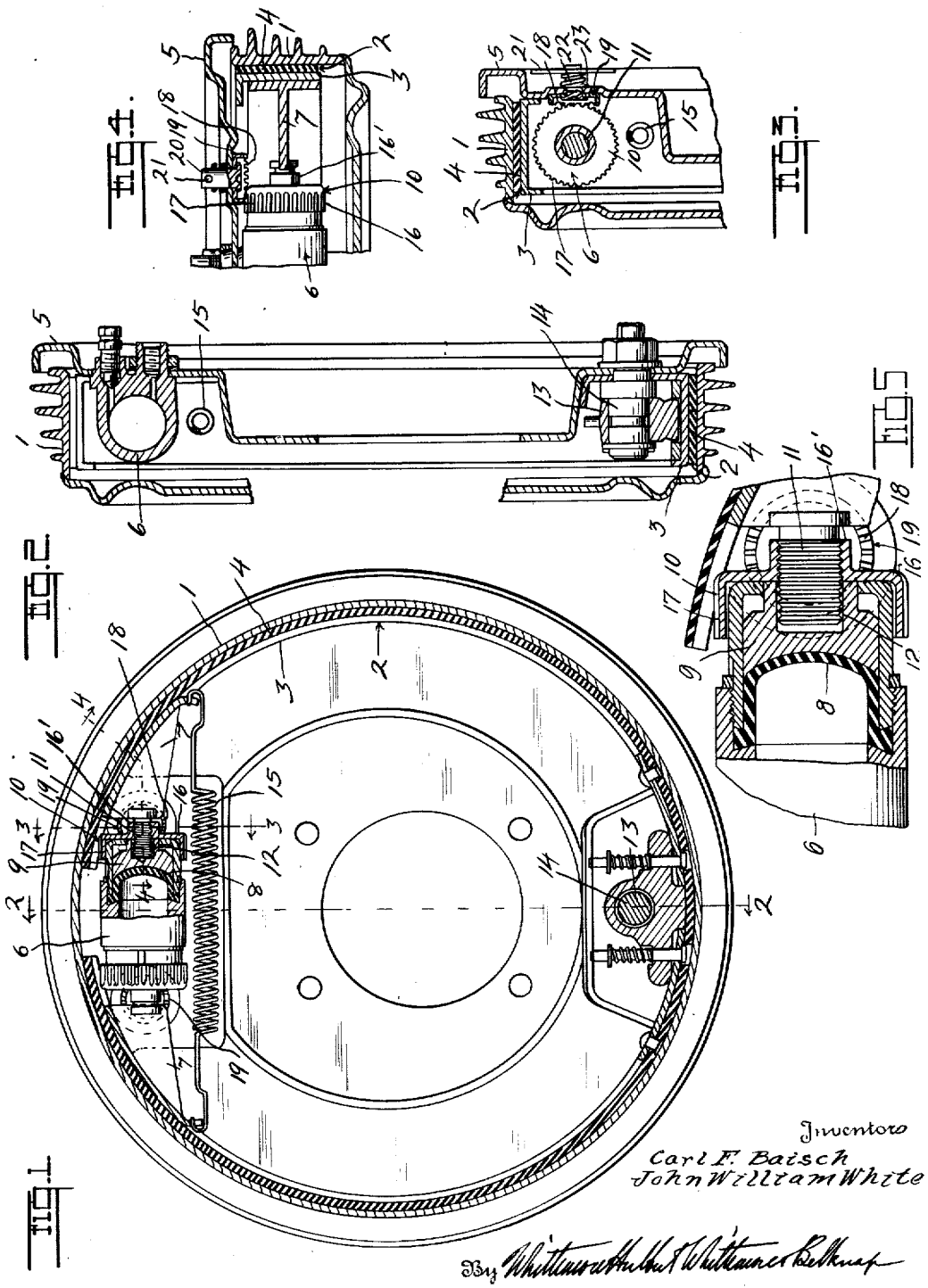

2,002,876

UNITED STATES PATENT OFFICE 2,002,876

BRAKING MECHANISM

Carl F. Baisch and John William White, Detroit, Mich.; said Baisch assignor to Kelsey-Hayes Wheel Company, Detroit, Mich., a corporation of Delaware Application November 14, 1932, Serial No. 642,678

9 Claims. (Cl. 188—79.5)

The invention relates to braking mechanism and refers particularly to vehicle braking mechanism of the internal type. One of the objects of the invention is to so construct the braking mechanism that it may be readily manually adjusted to provide limited clearance between the brake drum and the brake friction means within the drum. Other objects are to provide an improved adjusting means for the braking mechanism which does not interfere with its operation; to provide an improved adjusting means which is operable from outside the backing plate; and to provide an improved adjusting means which is effectively held in its adjusted positions.

These and other objects of the invention will become apparent from the following description, taken in connection with the accompanying drawing, in which Figure 1 is a sectional view of a braking mechanism showing an embodiment of my invention;

Figures 2, 3 and 4 are cross sections on the lines 2—2, 3—3 and 4—4, respectively, of Figure 1;

Figure 5 is an enlarged view of a portion of Figure 1.

As illustrated in the present instance, 1 is the brake drum which is adapted to be secured to a wheel of a motor vehicle and 2 is the brake friction means within the brake drum. This brake friction means, as shown, comprises the transversely split flexible band 3 and the lining 4. 5 is the backing plate for closing the brake drum.

For actuating the brake friction means to engage the brake flange of the brake drum, means is provided between the ends of the friction means for spreading the same apart. This means comprises the support 6 which is mounted upon and fixedly secured to the backing plate 5 between the brackets 7 upon the ends of the band 3. This support in the present instance is a cylinder having fixedly secured therein the flexible cup-shaped diaphragms 8, which with the support form a sack for receiving a fluid under pressure. Each diaphragm is engageable with a plunger 9 slidable in the cylinder and the outer end of each plunger is adapted to abut the nut 10 which is threaded upon the externally threaded member or screw 11. Each screw freely movably extends into the axial recess 12 in the adjacent plunger and each screw has its outer end bifurcated to embrace the adjacent bracket 7. With this construction, it will be seen that when fluid under pressure enters the sack the plungers will be forced away from each other and through the nuts and the screws the ends of the brake band will be separated and forced into engagement with the brake flange of the brake drum. Auxiliary means comprising the rockable member 13 upon the pin 14 secured to the backing plate 5 diametrically opposite the split in the band also may be used for urging the central portion of the band against the brake flange of the brake drum upon actuation of the spreading means. 15 is a coil spring which is secured to the brackets 7 and is located between the support 6 and the axis of the brake drum and which urges the ends of the band toward each other and holds the brackets against the screws and the nuts 10 against the ends of the support 6.

Each nut 10 is cup-shaped and has the cup-shaped portion 16 extending over the adjacent cylinder end and the reduced portion 16' which is threaded upon the adjacent screw 11. The periphery of the cup-shaped portion is formed with the axially extending teeth 17 which mesh with the teeth 18 of the sheet metal cup-shaped gear 19, the teeth 18 being at the edge of the peripheral flange of the gear member. This gear is located at the inner side of the backing plate 5 and it is fixedly secured to the stem 20 which is journaled in and extends through the backing plate. The axis of the stem and the gear extends transversely of the axis of the nut 10 and these axes preferably intersect and are in the same plane. The axis of each stem 20 is also located beyond the cup-shaped portion 16 of the adjacent nut, so that the teeth 18 meshing with the teeth 17 do not interfere with the operation of the means for actuating or spreading apart the ends of the brake friction means. In this connection, however, the teeth 17 are of sufficient length to retain the meshing relationship during the operation of the actuating or spreading means.

The outer end of each stem 20 is provided with suitable means located outside the backing plate for manually rotatably adjusting each stem and its gear and thereby varying the position of the associated screw relative to its plunger and providing limited clearance between the brake friction means and the brake flange of the brake drum. As shown, the outer end of each stem has the rod 21 extending therethrough and suitably secured thereto. For the purpose of holding each stem and its associated gear in its various positions of rotative adjustment, each gear is held against the inner side of the backing plate by means of the coil spring 22 encircling the portion of the stem between the outer side of the backing plate and the rod 21, one end of this coil spring abutting the rod and the other end preferably abutting the washer 23 engaging the outer side of the backing plate.

The arrangement of gears at the opposite ends of the support, nuts meshing with these gears and like screws threadedly engaged by the nuts is such that rotation of the gears in one direction advances their respective screws to reduce the clearance between the brake friction means and the brake drum and rotation of the gears in the opposite direction retracts their respective screws to increase the clearance. Also it will be seen that we have provided a simple construction for manually adjusting either or both of the ends of the brake friction means and that the adjusting means may be readily operated and does not interfere with the operation of the brake friction means. It will also be seen that the construction is such that the backing plate need not have exposed openings through which dirt, moisture and the like may enter.

What we claim as our invention is:

1. The combination of a brake drum, a backing plate, friction means within and engageable with said drum, means comprising reciprocable members for moving said friction means relative to said drum, means movable with said reciprocable members and adjustable relative thereto to control the positions thereof relative to each other, and adjustable means mounted on said backing plate and engaging said first mentioned adjustable means for adjusting the same.

2. The combination of a brake drum, a backing plate, friction means within and engageable with said drum, means comprising an axially movable threaded member for moving said friction means relative to said drum, an axially movable nut threaded upon said threaded member and having a toothed periphery, and a rotatable toothed member mounted on and having its axis of rotation fixed relative to said backing plate, said toothed member slidably engaging said toothed periphery whereby said friction means may be adjusted through said nut and actuated through said axially movable member.

3. The combination of a brake drum, a backing plate, friction means within and engageable with said drum, means comprising an axially movable threaded member for moving said friction means relative to said drum, a nut threaded on said threaded member and having its periphery provided with axially extending teeth, said nut being rotatable to axially move said threaded member, and a gear member mounted on said backing plate and operable from the outside thereof, said gear member having its teeth engaging the teeth of said nut and having its axis extending transversely of and substantially intersecting the axis of said nut.

4. The combination of a brake drum, a backing plate, friction means within and engageable with said drum, means for actuating said friction means, comprising a reciprocable plunger, a rotatable screw and a nut threaded upon said screw and adapted to abut said plunger, said nut having its periphery provided with axially extending teeth, a rotatably adjustable stem extending through said backing plate, a gear secured to said stem and having its teeth meshing with the teeth of said nut, and means for frictionally holding said gear in its adjusted positions of rotation.

5. The combination of a brake drum, a backing plate, friction means within and engageable with said drum, means comprising a threaded member for moving said friction means relative to said drum, a rotatable nut threaded upon said threaded member and having its periphery provided with axially extending teeth, a cup-shaped gear member having its edge provided with teeth meshing with the teeth of said nut, a stem to which said gear member is secured extending through said backing plate and provided with means outside said backing plate for rotating said stem, and spring means for holding said gear member in its various positions of rotation.

6. The combination of a brake drum, a backing plate, friction means within and engageable with said drum and having relatively movable ends, a support upon said plate, axially movable threaded members associated with said ends, axially movable nuts threadedly engaging said threaded members and normally engaging and positioned by said support, means carried by said support for actuating said nuts, a rotatable member for each nut mounted on and having its axis of rotation fixed relative to said plate, and cooperating means on said rotatable members and nuts for driving one from the other.

7. The combination of a brake drum, a backing plate, friction means within and engageable with said drum and having relatively movable ends, a support upon said plate, threaded members associated with said ends, nuts threadedly engaging said threaded members and normally engaging and positioned by said support, a rotatable member mounted on said plate for each nut, and cooperating means on said rotatable member and nut for rotating the latter from the former, said rotatable members being arranged symmetrically with respect to said nuts and support.

8. The combination of a brake drum, a backing plate, friction means within and engageable with said drum, means for actuating said friction means comprising a reciprocable member, a member adjustable relative to said reciprocable member, a rotatable member engaging said second mentioned member and adapted to abut and move with said reciprocable member, and a rotatably adjustable member mounted on said backing plate and having its axis of rotation fixed relative thereto, said rotatably adjustable member slidably engaging said rotatable member.

9. The combination of a brake drum, a backing plate, friction means within and engageable with said drum, an actuator for applying said friction means against said drum, said actuator comprising reciprocable means engaging said friction means, means having a toothed periphery reciprocable with said first mentioned means and adjustably rotatably mounted thereon and reciprocable means abutting said second mentioned means, and a gear member mounted on and having its axis of rotation fixed relative to said backing plate, said gear member being cup-shaped and having its edge provided with teeth meshing with the teeth of said second mentioned means.

CARL F. BAISCH.
JOHN WILLIAM WHITE.